UNITED STATES PATENT OFFICE

2,475,949

β-NAPHTHOSELENAZOLE COMPOUNDS

Homer W. J. Cressman, Glenside, Pa., assignor to Eastman Kodak Company, Rochester, N. Y., a corporation of New Jersey No Drawing. Application March 31, 1945, Serial No. 586,037

7 Claims. (Cl. 260—298)

This invention relates to β-naphthoselenazole compounds and, more particularly, to β-naphthoselenazole compounds which can be used to prepare 2-alkylthio-β-naphthoselenazole quaternary salts.

2-alkylthio-β-naphthothiazole quaternary salts are very useful intermediates in the preparation of cyanine and merocyanine dyes. 2-alkylthio-β-naphthoselenazole quaternary salts can also be employed for this purpose, I have found. However, whereas 2-alkylthio-β-naphthothiazole quaternary salts are readily obtainable from 2-mercapto-β-naphthothiazole which in turn can be prepared from α-isothiocyanonaphthalene via 2-chloro-β-naphthothiazole, the preparation of 2-alkylthio-β-naphthoselenazole quaternary salts by an analogous method has not been successful.

I have now found, however, that 2-alkylthio-β-naphthoselenazole quaternary salts can be obtained from 1-alkyl-2-imino-β-naphthoselenazolines by converting these to the 2-nitrosoimino compounds, thence to the 1-alkyl-β-naphthoselenazolones, thence to the 1-alkyl-β-naphthoselenazole thiones and finally by treatment with an alkyl salt to the 2-alkylthio-β-naphthoselenazole quaternary salts. Moreover, I have found that the 2-alkylthio-β-naphthoselenazole quaternary salts can be converted into 2-methyl-β-naphthoselenazole quaternary salts.

It is, accordingly, an object of my invention to provide new β-naphthoselenazole compounds. A further object is to provide a process for preparing such compounds. Other objects will become apparent hereinafter.

In accordance with my invention, I prepare 1-alkyl-2-imino-β-naphthoselenazolines (which can also be called 1-alkyl-2-iminonaphtho[1,2]-selenazolines) by oxidizing with halogen a 1-alkyl-1-(1-naphthyl)-2-selenourea. The oxidation is advantageously carried out in an anhydrous liquid carboxylic acid, such as glacial acetic acid, using bromine. Iodine can also be used. The invention is further illustrated by the following examples:

*Example 1.—2-imino-1-methylnaphtho[1,2] selenazoline*

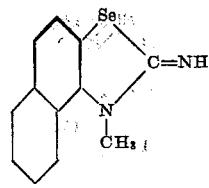

To a suspension of 52.6 parts of 1-methyl-1(1-naphthyl)-2-selenourea in 470 parts of glacial acetic acid, mechanically stirred and cooled in a water bath at 18 to 20°, were added dropwise, over a 30-minute period, 32 parts of bromine in 16 parts of glacial acetic acid. The bromo-addition product, which was somewhat sticky at first, was allowed to stand at room temperature for several hours. The reaction mixture was then stirred and heated in a water bath at 80 to 85° for 4 hours. Hydrogen bromide was evolved with the formation of a slate-colored hydrobromide, which, after cooling, was filtered, washed with acetone and diethyl ether, and dried. It was suspended in 800 parts of hot water into which sulfur dioxide was bubbled for 15 minutes. On addition of excess ammonia, the imino base separated as an oil. The mixture, while still warm, was extracted with 600 parts of chloroform and filtered by suction through a Norite filter pad. The bottom layer was separated, washed several times with water, and dried with potassium carbonate. After removal of the chloroform, the residue solidified after some time, instantly if seeded. The yield of brownish-colored product melting at 94 to 95° amounted to 39.2 parts (75 per cent of the theoretical amount). A portion recrystallized from ligroin (60 to 90° fraction) gave colorless needles that also melt at 94 to 95°.

Anal. Calcd. for $C_{12}H_{10}N_2Se$: C, 55.12; H, 3.86; Se, 30.32. Found: C, 55.05; H, 3.97; Se, 30.26.

*Example 2.—1-ethyl-2-iminonaphtho[1,2] selenazoline*

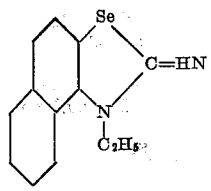

Employing the above procedure the ethyl imino base was obtained in lower yield. From 27.5 parts of 1-ethyl-1-(1-naphthyl)-2-selenourea were obtained 6 parts of crude product. Recrystallization from ligroin (60 to 90° fraction) gave colorless needles that melted at 82 to 84°. The yield amounted to 4 parts (15 per cent of the theoretical amount).

Anal. Calcd. for $C_{13}H_{12}N_2Se$: C, 56.66; H, 4.39; Se, 28.76. Found: C, 56.36; H, 4.59; Se, 28.35.

In a manner similar to that illustrated in the foregoing examples, 1-propyl, 1-butyl or other 1-alkyl-2-iminonaptho [1,2] selenazolines can be prepared.

The 1-alkyl-1-(1-naphthyl)-2-selenoureas employed in the foregoing examples can be prepared as illustrated in the following examples.

*Example 3.—1-methyl-1-(1-naphthyl)-2-selenourea*

In a suitable vessel, fitted with two inlet tubes, one of fairly large diameter, extending nearly to the bottom and an outlet tube connected to an absorption train, was placed a solution of 350 parts of absolute ethyl alcohol and 75 parts of N-methyl-1-naphthylcyanamide [von Braun, Heider, and Müller, Ber. 51, 281 (1918)]. The entire apparatus was swept with dry nitrogen for at least 20 minutes. An excess of hydrogen selenide, generated by slowly dropping 450 parts of dilute hydrochloric acid (420 parts water, 30 parts concentrated acid) on 100 parts of aluminum selenide, and dried first by calcium chloride and then by calcium sulfate, "Drierite," was slowly passed into the solution through the large inlet tube. Through the other inlet tube was bubbled ammonia at about the same rate; this was discontinued during the last 30 minutes of the run (2 hours). The reaction mixture was maintained at 20° by immersion in a water bath, intermittently hand-shaken, and kept in subdued light. When the reaction had been completed, the apparatus was again swept with nitrogen for 20 minutes. After chilling in an ice-salt bath, the nearly colorless product was filtered, washed thoroughly with water, cold alcohol, and dried. The crude yield amounted to 100 parts (93 per cent of the theoretical amount). The colorless crystals, 82 per cent after recrystallization from 95 per cent ethanol, melted at 174 to 175° with decomposition.

*Example 4.—1-ethyl-1-(1-naphthyl)-2-seleneourea*

The ethyl homolog was prepared similarly. From 32 parts of N-ethyl-1-naphthylcyanamide were obtained 45.2 parts (80 per cent of the theoretical amount). The recrystallized product melted at 168 to 170° with decomposition.

The 1-alkyl-2-iminonaphtho [1,2] selenazolines which I obtain in accordance with my invention can be converted to 1-alkyl-2-nitrosoiminonaphtho [1,2] selenazolines by treatment with nitrous acid. Advantageously, the imino compound is treated with an alkali metal nitrite, in the presence of an anhydrous liquid carboxylic acid, such as glacial acetic acid. The following examples illustrate further the formation of 1-alkyl-2-nitrosoiminonaphtho [1,2] selenazolines.

*Example 5.—1-methyl-2-nitrosoiminonaphtho [1,2] selenazoline*

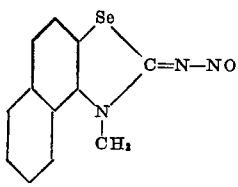

To a solution of 26.1 parts of 2-imino-1-methylnaphtho [1,2] selenazoline in 520 parts of glacial acetic acid, mechanically stirred and maintained at 20 to 22° by external means, were added dropwise, over a 30-minute period, 12 parts of sodium nitrite in 15 parts of water. The orange-colored crystals, after standing at room temperature for an hour, were filtered, washed with water, ethyl alcohol, diethyl ether, and dried. The yield of nitrosoimino compound melting at 162 to 165°, with violent decomposition, was 26 parts (90 per cent of the theoretical amount). An additional 1.5 parts can be obtained on diluting the mother liquor with 500 parts of water.

*Example 6.—1-ethyl-2-nitrosoiminonaphtho [1,2] selenazoline*

The ethyl homolog was prepared similarly. From 3 parts of 1-ethyl-2-iminonaphtho [1,2] selenazoline, the yield of orange-colored crystals melting at 175° with decomposition amounted to 2.4 parts (72 per cent of the theoretical amount).

In a similar manner, 1-propyl, 1-butyl and other 1-alkyl-2-nitrosoiminonaphtho [1,2] selenazolines can be prepared.

The 1-alkyl-2-nitrosoiminonaphtho [1,2] selenazolines which I obtain in accordance with my invention can be converted to 1-alkylnaphtho [1,2] selenazol-2(1)-ones by heating the nitrosoimino compounds to a temperature at which nitrogen is evolved. Heating at the temperature of a boiling xylene is advantageously employed, in a medium such as a xylene. The following examples illustrate further the formation of 1-alkylnaphtho [1,2] selenazol-2(1)-ones.

*Example 7.—1-methylnaphtho [1,2] selenazol-2(1)-one*

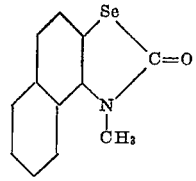

To 25 parts of a dry xylene heated to boiling in an oil bath maintained at 155 to 160° were added in portions, without further heating, 0.5 part of 1-methyl-2-nitrosoiminonaphtho [1,2] selenazoline. The brisk evolution of nitrogen was allowed to subside before another portion was added. The reaction mixture was then heated in the oil bath as long as nitrogen was evolved and until the orange-colored solution became a lemon-yellow (20 minutes). On distilling the xylene under diminished pressure on the steam bath the ketone was obtained quantitatively. The product melted at 124 to 125° before and after recrystallization from methyl alcohol.

Anal. Calcd. for: $C_{12}H_9NOSe$: Se, 30.2. Found: Se, 30.77.

In a similar manner, 1-ethylnaphtho [1,2] selenazol-2(1)-one was prepared. Likewise 1-propyl-, 1-butyl- and other 1-alkylnaphtho [1,2] selenazol-2(1)-ones can be prepared.

The 1-alkylnaphtho [1,2] selenazol-2(1) ones which I obtain in accordance with my invention can be converted to 1-alkylnaphtho [1,2] selenazol-2(1)-thiones by treatment with phosphorous pentasulfide. The reaction is advantageously carried out in reaction medium of a liquid aromatic hydrocarbon of the benzene series, e. g. a xylene. The following examples will serve to illustrate further the formation of 1-alkylnaphtho [1,2] selenazol-2(1)-thiones.

*Example 8.—1-methylnaphtho [1,2] selenazol-2(1)-thione*

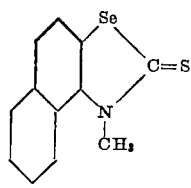

To the lemon-colored solution of 1-methylnaphtho [1,2] selenazol-2(1)-one in 450 parts of a dry xylene, prepared from 26 parts of 1-methyl-2-nitrosoiminonaphtho [1,2] selenazoline in the manner described above, were added in portions, with mechanical stirring, 26 parts of phosphorous pentasulfide. The whole was stirred and heated in an oil bath at 155 to 160° for 4 hours. A drop of pyridine was added every 30 minutes during the heating period. The reaction mixture was allowed to cool and then filtered. From the filtrate on concentration to a small volume (50 parts) and addition of 160 parts of 95 per cent ethanol were obtained 19.3 parts of product (78 per cent of the theoretical amount). The almost colorless crystals melted at 151 to 152° before and after recrystallization from methyl alcohol.

Anal. Calcd. for $C_{12}H_9NSSe$: C, 51.75; H, 3.26; Se, 28.45. Found: C, 51.91; H, 3.28; Se, 28.22.

*Example 9.—1-ethylnaphtho [1,2] selenazol-2(1)-thione*

The ethyl homolog was prepared similarly. From 0.8 part of nitrosoimino compound were obtained 0.6 part of thione (80 per cent of the theoretical amount). The colorless crystals obtained on crystallization from a 1:1 (by volume) methanol benzene mixture melted at 175 to 176°.

Anal. Calcd. for $C_{13}H_{11}NSSe$: C, 53.37; H, 3.79; Se, 27.04. Found: C, 53.26; H, 3.93; Se, 26.86.

In a similar manner, 1-propyl-, 1-butyl- and other 1-alkylnaphtho [1,2] selenazol-2(1)-thiones can be prepared.

The 1-alkylnaphtho [1,2] selenazol-2(1)-thiones which I obtain in accordance with my invention can be converted to 1-alkyl-2-alkylthionaphtho [1,2] selenazolium quaternary salts by heating with alkyl salts, e. g. alkyl halides, dialkyl sulfates, alkyl arylsulfonates, etc. 1-alkyl-2-alkylthionaphtho [1,2] selenazolium quaternary salts can also be called 1-alkyl-2-alkylmercaptonaphtho [1,2] selenazolium quaternary salts. The following examples will serve to illustrate further the formation of the quaternary salts.

*Example 10.—1-methyl-2-methylmercaptonaphtho [1,2] selenazolium p-toluenesulfonate*

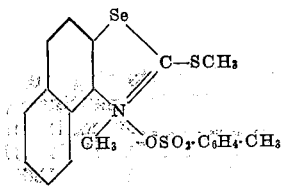

A mixture of 20.8 parts of 1-methylnaphtho [1,2] selenazol-2(1)-thione and 28 parts of methyl p-toluenesulfonate was heated in an oil bath at 145 to 150° for 2 hours. The solid mass was cooled, broken up and suspended in 150 parts of acetone. The yield of salt well washed with acetone and ether amounted to 33.7 parts (98 per cent of the theoretical amount). The colorless product melted at 236 to 237°.

*Example 11.—1-ethyl-2-ethylmercaptonaphtho [1,2] selenazolium p-toluenesulfonate*

The 1-ethyl salt was prepared similarly from 0.3 part of 1-ethylnaphtho [1,2] selenazol-2(1)-thione and 0.3 part of ethyl p-toluenesulfonate. The yield of product melting at 185 to 190° amounted to 0.3 part (60 per cent of the theoretical amount).

In a similar manner 1-propyl-2-propylmercapto-, 1-methyl-2-butylmercapto- and other 1-alkyl-2-alkylmercaptonaphtho [1,2] selenazolium quaternary salts can be prepared. The quaternary salts shown in the foregoing examples can be converted to the iodides or the perchlorates by treatment with an aqueous solution of sodium iodide or sodium perchlorate.

The 1-alkyl-2-alkylmercaptonaphtho [1,2] selenazolium quaternary salts which I obtain in accordance with my invention can be converted into 1-alkyl-2-methylnaphtho [1,2] selenazolium quaternary salts by first condensing the alkylmercapto compound with a malonic ester and then hydrolyzing the resulting condensation product and heating to split carbon dioxide out therefrom. The condensations are advantageously effected in the presence of an alkali metal alcoholate. Diethyl-, dimethyl-, dipropyl- or any dialkyl malonate can be employed. The hydrolysis is advantageously an acid hydrolysis, using hydrochloric, hydrobromic, sulfuric or any suitable acid. The following examples will illustrate further the formation of 1-alkyl-2-methylnaphtho [1,2] selenazolium quaternary salts.

*Example 12.—1,2-dimethylnaphtho [1,2] selenazolium chloride*

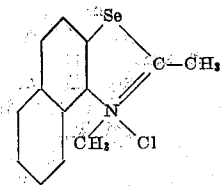

A mixture of 23.2 parts of 1-methyl-2-methylmercaptonaphtho[1,2]selenazolium p-toluenesulfonate, 21 parts of ethyl malonate, 1.27 parts of sodium (.01 g. Na/cc. solution of sodium ethylate), and 75 parts of absolute ethyl alcohol was refluxed on the steam bath for 1½ hours. A condensation product separated from the hot solution. After cooling in an ice-salt bath for 30 minutes, it was filtered, sucked dry as possible on the filter, and added to 368 parts of concentrated hydrochloric acid. On heating the mixture on the steam bath, solution was effected accompanied with a brisk evolution of carbon dioxide. Heating was continued for 3½ hours. After cooling, the colorless methyl salt that began to separate from the hot reaction mixture after 15 to 20 minutes of heating, was filtered, washed with 25 parts of cold water, 150 parts of acetone and diethyl ether. The yield of product melting at 230 to 232° with decomposition amounted to 12.6 parts. An additional 1.5 parts can be obtained on removal of the acid under reduced pressure on the water bath and washing the residue with acetone (95 per cent of the theoretical amount). A portion dissolved in methanol, filtered and precipitated with ether gave colorless crystals that melted at 234 to 235° with decomposition.

Anal. Calcd. for $C_{13}H_{12}ClNSe$: C, 52.58; H, 4.08; Se, 26.69. Found: C, 52.29; H, 3.82; Se, 26.30.

In a similar manner 1-ethyl-, 1-(n-propyl)-, 1-(n-butyl)- and other 1-alkyl-2-methylnaphtho-[1,2]-selenazolium quaternary salts can be prepared.

The 1-alkyl-2-methylnaphtho[1,2]selenazolium quaternary salts obtained in accordance with my invention can be condensed with 2-iodoquinoline alkyl quaternary salts to give 1',3-dialkyl-4,5-benzoselena-2'-cyanine salts (dyes). The condensations are advantageously effected in the presence of an acid-binding agent, e. g. sodium carbonate, sodium ethylate, a trialkylamine, a N-alkylpiperidine, etc. The following example will serve to illustrate further the formation of 1',3-dialkyl-4,5-benzoselena-2'-cyanine salts.

*Example 13.—1',3-dimethyl-4,5-benzoselena-2'-cyanine iodide*

A mixture of 0.6 part of 1,2-dimethylnaphtho-[1,2]selenazolium chloride, 0.8 part of 2-iodoquinoline methiodide, 0.4 part of triethylamine, and 24 parts of absolute ethyl alcohol was refluxed on the steam bath for 15 minutes. After cooling, the dye was filtered and washed with water, alcohol and acetone. The reddish-bronze rods obtained on recrystallization from methyl alcohol melted at 235° to 236° with decomposition. The yield amounted to 0.25 part (23 per cent of the theoretical amount). A solution of the dye in methyl alcohol was reddish-orange.

In a similar manner 1',3-diethyl-, 1'-ethyl-3-methyl-, 1',3-di-n-propyl-, 1',3-di-n-butyl- and other 1',3-dialkyl - 4,5 - benzoselena-2'-cyanine salts can be prepared.

The 1-alkyl-2-alkylmercaptonaphtho[1,2]selenazolium salts obtained in accordance with my invention can be condensed with lepidine alkyl quaternary salts to give 1',3-dialkyl-4,5-benzoselena-4'-cyanine salts (dyes). The condensations are advantageously effected in the presence of an acid-binding agent, e. g. sodium carbonate, sodium ethylate, a trialkylamine, a N-alkylpiperidine, etc. The following example will serve to illustrate further the formation of 1',3-dialkyl-4,5-benzoselena-4'-cyanine salts.

*Example 14.—1',3-dimethyl-4,5-benzoselena-4'-cyanine iodide*

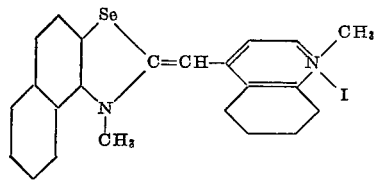

This dye was prepared by refluxing on a steam bath for 15 minutes 0.5 part of 1-methyl-2 - methylmercaptonaphtho[1,2]selenazolium p-toluenesulfonate and 0.3 part of lepidine methiodide in 20 parts of absolute ethyl alcohol and 0.1 part of triethylamine. After cooling the dye was filtered, washed with water, alcohol and acetone. The reddish-bronze needles obtained on recrystallization from methyl alcohol melted at 245° to 246° with decomposition. The yield amounted to 0.35 part (66 per cent of the theoretical amount). A solution of the dye in methyl alcohol was bluish-red.

In a similar manner 1',3-diethyl-, 1'-ethyl-3-methyl-, 1',3-di-n-propyl, 1',3-di-n-butyl- and other 1',3-dialkyl - 4,5 - benzoselena-4'-cyanine salts can be prepared.

The 1-alkyl-2-alkylmercaptonaphtho[1,2]selenazolium salts and the 1-alkyl-2-methylnaphtho[1,2]selenazolium salts obtained in accordance with my invention can be condensed together to give 3,3'-dialkyl-4,5,4',5'-dibenzoselenacyanine salts (dyes). The condensation is advantageously carried out in the presence of an acid-binding agent, e. g. sodium carbonate, sodium ethylate, a trialkylamine, a N-alkylpiperidine, etc. The following example will serve to illustrate further the formation of 3,3'-dialkyl-4,5,4',5'-dibenzoselenacyanine salts.

*Example 15.—3,3'-dimethyl-4,5,4',5'-dibenzoselenacyanine chloride*

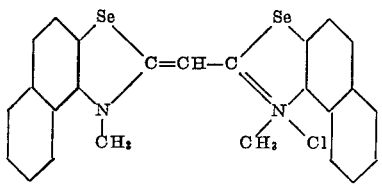

A mixture of 0.5 part of 1-methyl-2-methylmercaptonaphtho[1,2]selenazolium p-toluenesulfonate, 0.3 part of 1,2-dimethylnaphtho[1,2]selenazolium chloride, 0.1 part of triethylamine, and 20 parts of absolute ethyl alcohol was heated under reflux for 10 minutes. The dye began to separate from the hot solution after only 3 minutes of heating. After cooling, it was filtered and washed with water, alcohol, and acetone. The yellowish-orange needles obtained on recrystallization from methyl alcohol melted at 277° to 278°. The yield amounted to 0.35 part (65 per cent of the theoretical amount). A solution of the dye in methyl alcohol was yellow.

In a similar manner 3,3'-diethyl-, 3,3'-di-n-propyl-, 3,3'-di-n-butyl-3-ethyl-3'-methyl- and other 3,3'-dialkyl-4,5,4',5'-dibenzoselenacyanine salts can be prepared.

The 1 - alkyl - 2 - alkylmercaptonaphtho [1,2] selenazolium salts obtained in accordance with my invention can be converted into 3,3'-dialkyl-4,5,4',5'-dibenzoselenacarbocyanine salts (dyes) by condensation of 2-molecular proportions of the alkylmercapto compound with about 1 molecular proportion of glutaconic acid. The condensation is advantageously carried out in the presence of an acid-binding agent, such as pyridine. The following example will serve to illustrate further the formation of such dyes.

*Example 16. — 3,3'-dimethyl-4,5,4',5'-dibenzoselenacarbocyanine bromide*

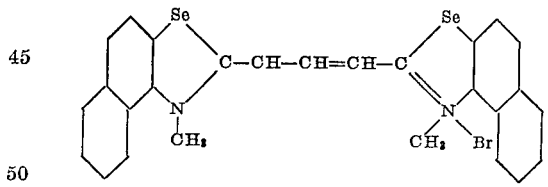

A mixture of 2.3 parts of 1-methyl-2-methylmercaptonaphtho[1,2]selenazolium p-toluenesulfonate and 0.7 part of glutaconic acid in 41 parts of dry pyridine was refluxed for 30 minutes by heating in an oil bath at 125° to 130°. On cooling, the dye separated from the blue solution. It was filtered and thoroughly washed with water, alcohol and acetone. The yield amounted to 0.3 part (17 per cent of the theoretical amount). The prisms, which had a metallic luster and melted at 256° to 257° were dissolved in hot pyridine and converted to the bromide in the usual manner by adding excess aqueous potassium bromide to the hot solution. The lumps of bluish needles that separate on cooling melted at 220° to 222° with decomposition.

In a similar manner, 3,3'-diethyl-, 3,3'-di-n-propyl, 3,3'-di-n-butyl- and other 3,3'-dialkyl-4,5,4',5'-dibenzoselenacarbocyanine salts can be prepared.

The cyanine dyes which I have obtained from my new naphthoselenazole compounds can be employed to sensitize photographic emulsions. In the preparation of photographic emulsions containing my new dyes, it is only necessary to disperse the dyes in the emulsions. The methods of incorporating sensitized dyes in emulsions are simple and well known to those skilled in the art. It is convenient to add one or more of the dyes from a solution in an appropriate solvent. Methanol has proved satisfactory as a solvent for the dyes which I have obtained. Ethyl alcohol may also be employed.

Sensitization by means of the dyes I have obtained is, of course, directed primarily to the ordinarily employed gelatino-silver-halide developing-out emulsions. The dyes are advantageously incorporated in the washed, finished emulsions and should be uniformly distributed throughout the emulsions. The concentration of the dyes in the emulsion can vary widely, i. e. from about 5 to about 100 mg. per liter of flowable emulsion. The concentration of the dyes will vary according to the type of light-sensitive materials in the emulsion and according to the effects desired. The suitable and most economical concentration for any particular emulsion will be apparent to those skilled in the art upon making the ordinary tests and observations customarily used in the art of emulsion making.

To prepare gelatino-silver-halide emulsions sensitized with one of the dyes which I have obtained, the following procedure is satisfactory: A quantity of dye is dissolved in methyl alcohol or other suitable solvent and a volume of this solution (which may be diluted with water) containing from 5 to 100 mg. of dye is slowly added to about 1000 cc. of a gelatino-silver-halide emulsion, with stirring. Stirring is continued until the dye is uniformly distributed throughout the emulsion. With most of the dyes, 10 to 20 mg. of dye per liter of emulsion suffice to produce the maximum sensitizing effect with the ordinary gelatino-silver-bromide (including bromiodide) emulsions. With gelatino-silver-chloride emulsions, somewhat larger concentrations of dye may be necessary to secure the optimum sensitizing effect.

The above statements are only illustrative and are not to be understood as limiting my invention in any sense, as it will be apparent that my new dyes can be incorporated by other methods in many of the photographic silver halide emulsions customarily employed in the art. For instance, the dyes may be incorporated by bathing a plate or film upon which an emulsion has been coated, in the solution of the dye in an appropriate solvent. Bathing methods, however, are not to be preferred ordinarily.

The dye of Example 13 sensitized a gelatino-silver-bromiodide photographic emulsion to about 575 mu. with maximum sensitivity at about 555 mu.

The dye of Example 14 sensitized a gelatino-silver-bromiodide photographic emulsion with maximum sensitivity at about 560 mu.

The dye of Example 15 sensitized a gelatino-silver-chlorobromide photographic emulsion to about 555 mu. with maximum sensitivity at about 510 mu.

The dye of Example 16 sensitized a gelatino-silver-bromiodide photographic emulsion to about 680 mu. with maximum sensitivity at about 650 mu.

What I claim as my invention and desire to be secured by Letters Patent of the United States is:

1. The 1-alkyl-2-iminonaphtho [1,2] selenazoline compounds which are represented by the following general formula:

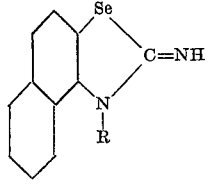

wherein R represents an alkyl group.

2. The 1-alkyl-2-iminonaphtho [1,2] selenazoline compound which is represented by the following formula:

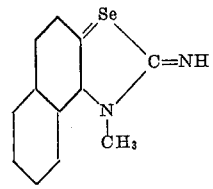

3. The 1-alkyl-2-iminonaphtho [1,2] selenazoline compound which is represented by the following formula:

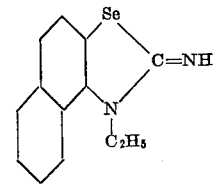

4. A process for preparing a 1-alkyl-2-iminonaphtho [1,2] selenazoline comprising oxidizing with halogen a 1-alkyl-1-(1-naphthyl)-2-selenourea.

5. A process for preparing a 1-alkyl-2-iminonaphtho [1,2] selenazoline comprising oxidizing with bromine a 1-alkyl-1-(1-naphthyl)-2-selenourea, in glacial acetic acid.

6. A process for preparing a 1-methyl-2-iminonaphtho [1,2] selenazoline comprising oxidizing with bromine a 1-methyl-1-(1-naphthyl)-2-selenourea, in glacial acetic acid.

7. A process for preparing a 1-ethyl-2-iminonaphtho [1,2] selenazoline comprising oxidizing with bromine a 1-ethyl-1-(1-naphthyl)-2-selenourea, in glacial acetic acid.

HOMER W. J. CRESSMAN.

REFERENCES CITED

The following references are of record in the file of this patent:

UNITED STATES PATENTS

| Number | Name | Date |
| --- | --- | --- |
| 2,112,139 | Brooker et al. | Mar. 22, 1938 |

FOREIGN PATENTS

| Number | Country | Date |
| --- | --- | --- |
| 305,262 | Germany | May 27, 1915 |
| 345,735 | Great Britain | Apr. 2, 1931 |

OTHER REFERENCES

Journal Chem. Society (London), Dec. 1935, pages 1762 to 1766.